United States Patent [19]

Noguchi

[11] 4,141,148
[45] Feb. 27, 1979

[54] CONTOUR MEASURING APPARATUS

[75] Inventor: Hironori Noguchi, Tokyo, Japan

[73] Assignee: Mitutoyo Mfg. Co., Ltd., Tokyo, Japan

[21] Appl. No.: 840,009

[22] Filed: Oct. 6, 1977

[30] Foreign Application Priority Data

Oct. 8, 1976 [JP] Japan .................. 51/135500[U]

[51] Int. Cl.$^2$ .............................................. G01B 7/28
[52] U.S. Cl. .................. 33/174 P; 33/148 H; 33/174 L
[58] Field of Search ............ 33/148 H, 174 P, 174 O, 33/174 L, 174 R

[56] References Cited

U.S. PATENT DOCUMENTS 3,319,341  5/1967  Graham ........................... 33/174 P Primary Examiner—Richard E. Aegerter
Assistant Examiner—Willis Little
Attorney, Agent, or Firm—Koda and Androia

[57] ABSTRACT

A contour measuring apparatus including a stylus for contacting an outer surface of an object to be measured, a support arm having mounted at the distal end thereof of the stylus, a slider movable in parallel with the longitudinal direction of the support arm and oscillatingly movable and pivotally supporting the support arm about a horizontal axis perpendicularly intersecting the longitudinal direction of the support arm, a feed screw shaft threadably coupled to the slider so as to move the slider in parallel with the longitudinal direction of the support arm and a differential transformer mounted between the support arm and the slider. The counter measuring device further includes a driven gear mounted at one end of the screw shaft, a first clutch connected by way of an idle gear meshing with the driven gear and a driving gear, a motor connected to the first clutch, a second clutch coaxially connected to the driven gear, a manual handle connected to the second clutch and a rotational angle detecting device for digitally detecting the rotation of the screw shaft. In a preferred embodiment, the rotational angle detecting device includes a case, a shaft rotatably supported by the casing connected to the feed screw shaft, a rotational angle detecting disk operationally associated with the shaft, sensing means for sensing the rotation of the disk and transferring means for transferring either the disk or sensing means in a direction for compensating for backlash by an amount equal to the backlash of the feed screw shaft when rotation of the feed screw shaft is started.

8 Claims, 6 Drawing Figures

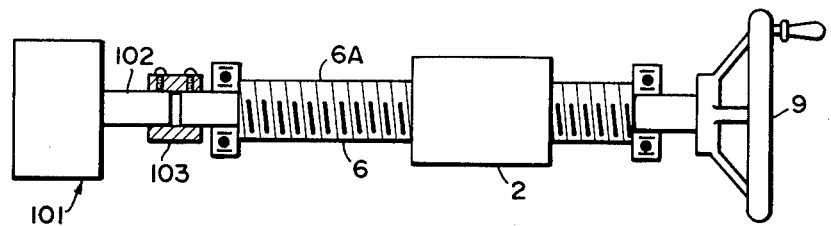
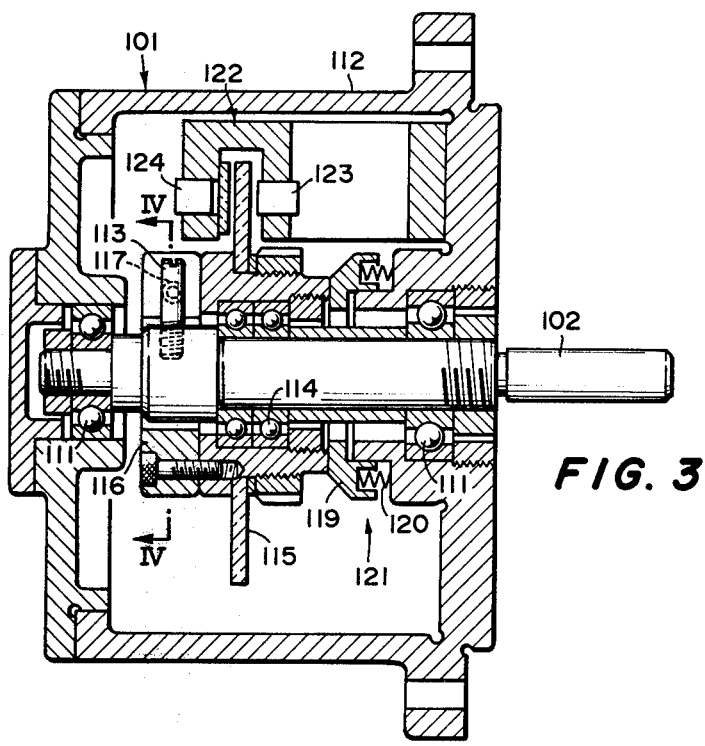
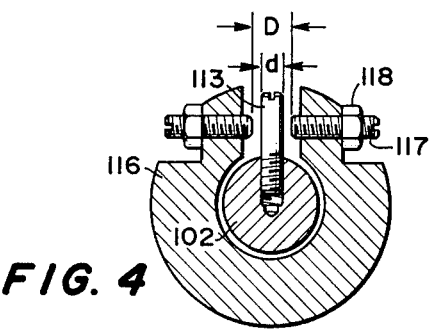

CONTOUR MEASURING APPARATUS

BACKGROUND OF THE INVENTION

1. Field of Invention

This invention relates to contour measuring apparatuses.

2. Prior Art

A contour measuring apparatus of the prior art comprises a stylus adapted to be moved in contact with the outer surface of an object to be measured, a support arm for the stylus, a slider vertically movably supporting the support arm relative to the outer surface of the object and horizontally movable, a differential transformer detecting the vertical displacement of the support arm, a screw shaft for horizontally moving the slider and a motor driving the screw shaft. In general, it has been usual practice that the contour measuring apparatus is used together with a recorder such as a pen recorder. In that case, the recording paper feeding on the recorder is turned in synchronism with the motion of the slider of the contour measuring apparatus and the pen of the recorder is adapted to be driven in accordance with the output of the differential transformer of the contour measuring apparatus.

To keep the movement of the paper feeding on the recorder in synchronism with the motion of the slider of the contour measuring apparatus, synchronizing motors are used as the motor of the contour measuring apparatus and the paper feed motor. Accordingly, as viewed from a common sense approach, the motor of the contour measuring apparatus and the paper feed motor should be in perfect synchronism. However, in reality, a gear train is interposed between the motor of the contour measuring apparatus and the screw mechanism for driving the slider and the irregularities in the rotation of these gears resulted in a nonuniform speed motion of the slider and the stylus which causes a difficulty.

Moreover, the contour measuring apparatus known in the art is of such a construction that the slider supporting the stylus cannot be manually operated. Even if manual operation were performed, the paper feeding the recorder or the motion of the pen does not occur in the case of manual operation and hence the recording of the contour measured by manual operation is impossible. Furthermore, the prior art contour measuring apparatus is not capable in the automatic mode of measuring the contour of the small object. In addition, the backlash between the feed screw shaft and the transferrable member threadably coupled to the feed screw shaft in the prior art contour measuring apparatus introduces additional errors in the values measured by the contour measuring apparatus.

SUMMARY OF THE INVENTION

Accordingly, it is the general object of the present invention to provide a contour measuring apparatus wherein the motor driving the slider of the contour measuring apparatus and the motor driving the paper feed of the recorder can be brought into perfect synchronism.

It is another object of the present invention to provide a contour measuring apparatus wherein the stylus can be manually operated.

It is still another object of the present invention to provide a contour measuring apparatus wherein automatic recording can be performed by the pen recorder even when the stylus is manually operated.

It is yet another object of the present invention to provide a contour measuring apparatus wherein the backlash between the feed screw and the transferrable member is compensated for.

in keeping with the principle of the present invention the objects are accomplished by an improved contour measuring apparatus including a stylus for contacting an outer surface of the object to be measured, a support arm having mounted at the distal end thereof of the stylus, a slider movable in parallel with the longitudinal direction of the support arm and oscillatingly movable and pivotally supporting the support arm about a horizontal axis perpendicularly intersecting the longitudinal direction of the support arm, a feed screw shaft threadably coupled to the slider so as to move the slider in parallel with the longitudinal direction of the support arm and a differential transformer mounted between the support arm and the slider. The counter measuring apparatus further includes a driven gear mounted at the one end of the screw shaft, a first clutch, an idle gear meshing with the driven gear and coupling the first clutch to the driving gear, a motor coupled to the first clutch, a second clutch coaxially connected to the driving gear, a manual handle connected to the second clutch and a rotational angle detecting device for digitally detecting rotation fo the screw shaft.

In a preferred embodiment, the rotation angle detecting device includes a case, a shaft rotatably supported by the case and connected to the feed screw shaft, a rotational angle detecting disk operationally associated with the shaft, sensing means for sensing the rotation of the disk and tranferring means for transferring either the disk or sensing means in a direction for compensating for backlash by an amount equal to the backlash of the feed screw shaft when rotation of the shaft is started.

BRIEF DESCRIPTION OF THE DRAWINGS

The above mentioned and other features and objects of the present invention will become more apparent by reference to the following description taken in conjunction with the accompanying drawings; wherein like reference numerals denote like element, and in which:

FIG. 2 is a schematic front view illustrating the rotational angle detecting device coupled to a feed screw shaft in a contour measuring device in accordance with the teachings of the present invention;

FIG. 3 is a longitudinal sectional view showing a first embodiment of an improved rotational angle detecting device in accordance with the teachings of the present invention;

FIG. 4 is a cross sectional view taken along the line IV—IV in FIG. 3;

DETAILED DESCRIPTION OF THE INVENTION

Figure 1:
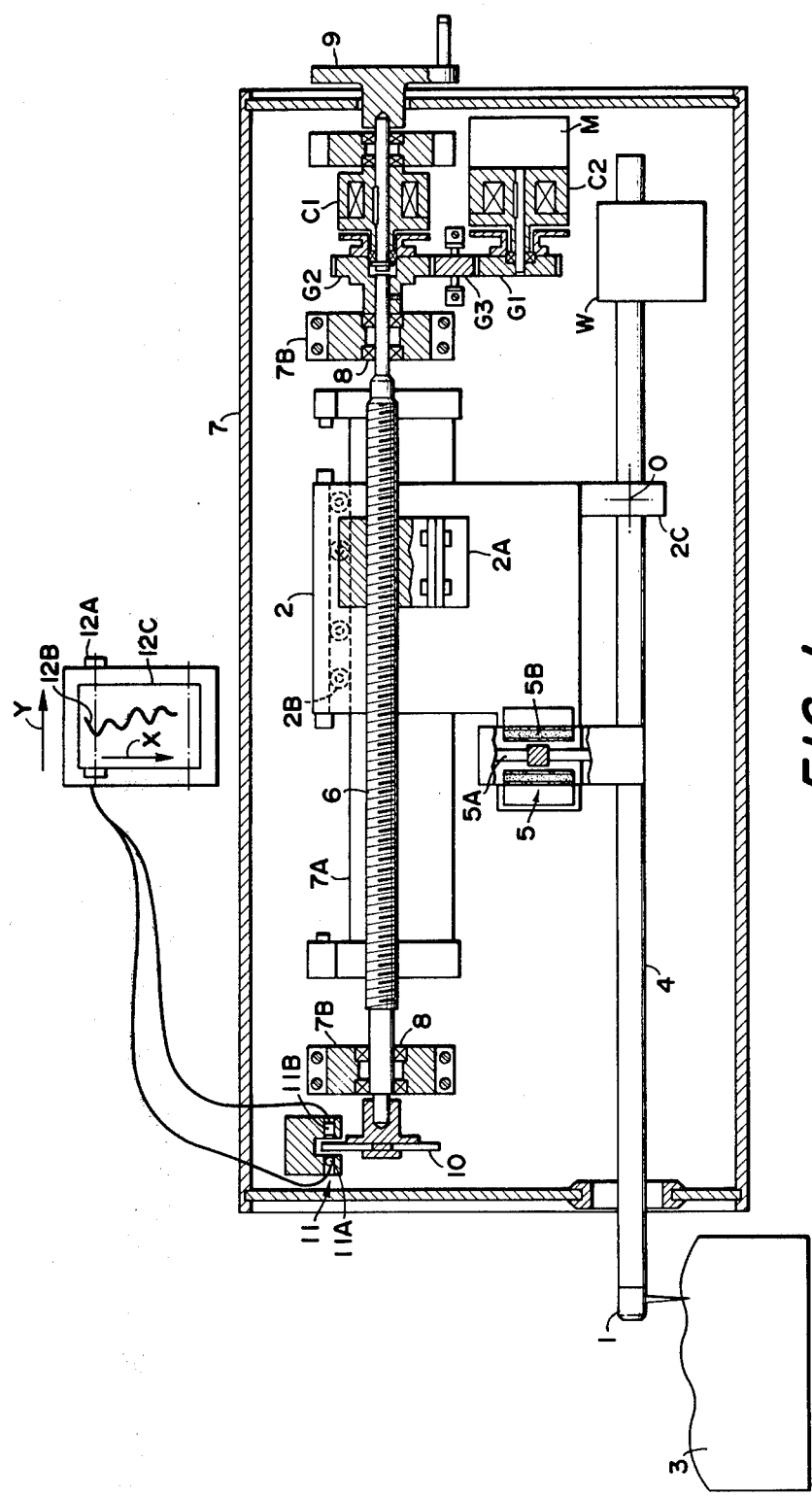
FIG. 1 is a cross sectional view illustrating a contour measuring apparatus in accordance with the teachings of the present invention.

Referring more particularly to the drawings, shown in FIG. 1 is a contour measuring device in accordance with the teachings of the present invention. In the figures, the contour of the outer surface of the object 3 is to be measured. The contour measuring apparatus incudes a case 7 which guard rails 7A are horizontally mounted and slidably supported on a guard rails 7A is a slider 2 having wheels 2B. Slider 2 is provided thereunder with a suspending arm 2C which supports a support arm 4 rotatable about a point O. The support arm 4 is provided at the forward end thereof with a stylus 1 contacting the outer surface of the object 3 and supporting a balance weight W movable along the other end of the support arm 4. Furthermore, to detect the displacement of the support arm 4 relative to the slider 2, a core 5A of the differential transformer 5 is mounted on the support arm 4 and coil 5B is mounted on the slider 2.

To move the slider 2 horizontally, a screw shaft 6 is supported by the brackets 7B of the casing 7 through bearings 8. The screw shaft 6 is rotatable, but not movable in the axial direction and engages a nut 2A on the slider 2. Opposite ends of the screw shaft 6 extend beyond the bracket 7B and a gear G2 is connected to the right end thereof. The gear G2 is connected to the driven side of a clutch C1 and meshes with an idle gear G3. Connected the driven side of the clutch C1 is a handle 9 so that the screw shaft 6 can be manually operated. The idle gear G3 meshes with a gear G1 which is connected to the driven side of a clutch C2. A motor M is connected to the driven side of the clutch C2.

Mounted on the left end of the screw shaft 6 is a slit disk or code disk 10. Photoelectric sensing means 11 are installed adjacent the opposite surfaces of the disk. Each photoelectric sensing means includes a projector 11A and a sensor 11B. The sensor 11B includes such things as photodiode or the like disposed in opposed relationship to the projector 11A and generates pulses commensurate to the rotational frequency of the screw shaft 6. The disk 10 and the photoelectric sensing means 11 constituted pulse generator generating pulses commensurate to the rotational frequency of the screw shaft, i.e., a rotational angle detecting device.

The sensor 11B of the photoelectric sensing means 11 is electrically connected to a paper feed motor 12A of a pen recorder 12. The motor 12A is a pulse motor well known in the art.

Pen recorder 12 includes a paper feed motor 12A, recording paper 12C driven by the motor 12A and a pen 12B performing the recording on the recording paper 12C. Means for driving the pen 12B are controlled by the output of the differential transformer 5 of the contour measuring apparatus.

In operation, when the clutch C1 is disengaged and the clutch C2 is engaged and the motor M is driven, the screw shaft 6 is rotated such as so as to move the slider 2 horizontally. Movement of the slider 2 causes the stylus 1 to contact and travel on the outer surface of the object 3. The stylus 1 vertically moves in accordance with the unevenness of the outer surface of the object 3. The extent of the vertical movement of the stylus 1 is detected by the differential transformer 5 so as to drive pen 12B of the recorder 12 in the direction X or Y. On the other hand, the rotational frequency of the screw shaft 6 is detected by the disk 10 and the photoelectric sensing means 11. The recording paper 12C is moved in the direction of X at a speed commensurate to the rotational frequency of the speed screw shaft 6 and the contour of the object to be measured is recorded on the paper 12C.

In case manual contour measuring is to be done, the clutch C1 is engaged and the clutch C2 is disengaged and the handle 9 is turned. In this case also, the recording paper 12C of the pen recorder 12 is moved commensurate to the travelling speed of the slider 2 and the pen 12B is moved commensurate to the output of the differential transformer 5.

As described above, with a contour measuring device in accordance with teachings of the present invention, the rotational frequency of the feed screw shaft 6 directly engaged with the slider 2 is detected, pulses commensurate to the rotational frequency of the feed screw shaft 6 are transmitted by the photoelectric sensing means 11 and the paper feed motor 12A is driven by the pulses from the photoelectric sensing means 11 such that movement of the slider 2 and the paper feeding of the recorder 12 can be brought into perfect synchronism. Furthermore, even if the manual operation of the slider 2 is desired, such manual operation can be accomplished by manually turning the screw shaft 6. Additionally, the slit disk or a code disk is not necessarily the only means for detecting the rotational frequency of the screw shaft 6 and other substitute means are useable therefore. In addition, if an X-Y recorder is utilized as the recorder 12, a D/A converter is required to be interposed between the rotational angle detecting device and the driving mechanism for moving the pen in X direction. Since the D/A converter should naturally be used when the invention is configured in this matter, a description of the interconnection and operation will be omitted.

Referring to FIG. 2, shown therein is a simplified diagram of the feed screw shaft 6 having coupled thereto a rotational angle detecting device 101. Such figure is for the purpose of providing a simplified schematic for describing additional embodiments of the rotational angle detecting device which compensate for backlash between the feed screw shaft 6 and the slider 2.

In FIG. 2, a shaft 102 of a rotational angle detecting device 101 is connected to the end of the feed screw shaft 6 by a coupling 103. The threaded portion 6A of the feed screw shaft 6 meshes with the slider 2 which is movable in accordance with the rotation of the feed screw shaft 6. A manual handle 9 is secured to the other end of the feed screw shaft 6.

Generally, in operation, the object to be measured by the coutour measuring apparatus is installed on the slider 2 and the movement of the slider 2 by means of the screw shaft 6 or the movement of the object 3 to be measured adapted to be detected by the rotational angle detecting device 101. As previously discussed in the description of the prior art, backlash exists between the slider 2 and the threaded portion 6A of the feed screw shaft 6.

In FIGS. 3 and 4 are shown a first embodiment of a rotational angle detecting device in accordance with the teachings of the present invention. The rotational angle detecting device 101 of FIGS. 3 and 4 includes a case 112 rotatably supported by the shaft 102 through bearings 111. In the case 112, one end of the first engageable member 113 consisting of a threaded pen is threadably coupled and secured to the shaft 102. Also a rotational angle detecting disk 115 is rotatably supported on the shaft 102 through bearings 114. The disk 115 consists of a graduated or slitted grass plate and a second engageable member 116 is secured thereto.

The second engageable member 116 is in the shape of letter C in cross section and a pair of headless screws 117 are mounted at the opening portion thereof in a manner that the screws 117 are adjustable in their positions and secured by means of nuts 118. The ends of the headless screws 117 are located opposite to the first engageable member 113 and the distance D between those screws 117 is adjusted to a dimension equal to a spacing jointly corresponding to the backlash of the feed screw 6 added to the thickness d of the first engageable member 113.

Added to one end (to the extreme right in the figures) of the disk 115 is one side of a plate 119. A plurality of compression coil springs 120 are confined between the other side of plate 119 and the case 112. The coil springs 120 and the plate 119 comprise a frictional mechanism 121. The frictional mechanism 121 is used for controlling the free rotation of the disk 115 and for preventing malfunction of the rotational angle detecting device.

Furthermore, the sensing means 122 for sensing the rotational angle of the disk 115 is provided on one side of the disk 115. The sensing means 122 is secured to the case 112 and comprises a lamp 123 and a light receiving element 124 which are located with the disk 115 thereinbetween.

In operation, when the handle 9 is turned, the slider 2 moves along the feeder shaft 6 and the rotation of the feed screw shaft 6 is transmitted to the shaft 102 of the rotational angle detecting device 101 through the coupling 103. The rotation of the shaft 102 is transmitted to the disk 115 through the first engageable member 113 and the headless screws 117 of the second engageable member 116. During the rotation of the disk 115, graduation or the like provided on the disk 115 are read by the sensing means 122 so that the rotation of the feed screw shaft 6 or the movement of the slider 2 can be read.

In this case, if the rotation of the feed screw shaft 6 is switched from one direction to the other, the slider 2 does not immediately move regardless of the rotation of the feed screw shaft 6 because of the backlash existing between the slider 2 and the feed screw shaft 6. On the other hand, along with the rotation of the feed screw shaft 6 in the reverse direction, the shaft 102 and the first engageable member 113 solidly secured to the shaft 102 do not immediately rotate in the reverse direction. However, the first engageable member 113 is merely abutting on the second emgageable member 116 and a spacing corresponding to the backlash of the feed screw shaft 6 exists thereinbetween. Hence, the second engageable member 116 and the disk 115 are not immediately rotated upon the rotation of the first engageable member 113 for an amount corresponding to the backlash. Accordingly, the disk 115 does not rotate for the amount over which the slider 2 has not moved due to the effects of the backlash so that any error in the reading of the rotational angle detecting device can be eliminated. Additionally, the disk 115 is controlled in its free rotation by the frictional mechanism 121 and hence the disk 115 never rotates unless the first engageable member 113 is engaged with the second engageable member 116 thereby preventing the malfunction of the contour measuring device in this area.

Figure 5:
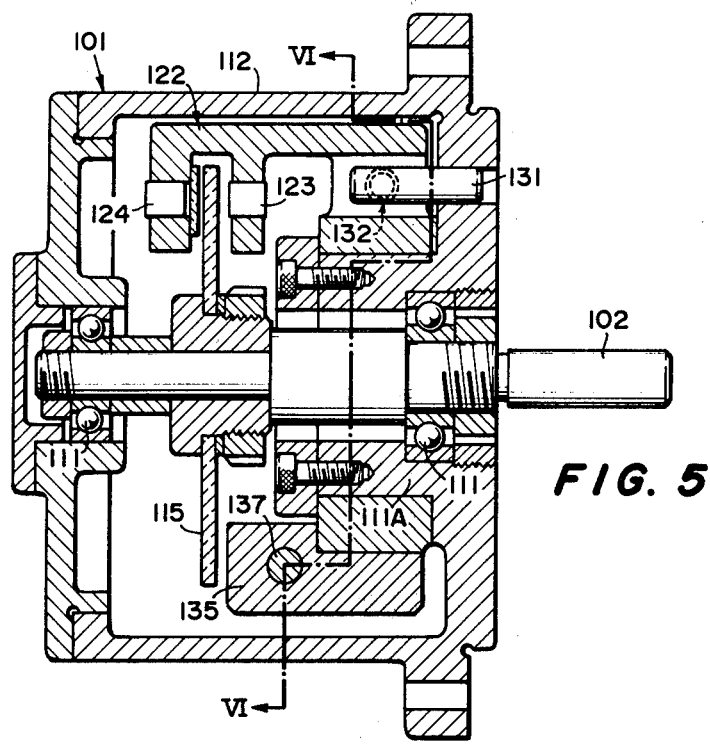
FIG. 5 is a longitudinal sectional view showing a second embodiment of an improved rotational angle detecting device in accordance with the teachings of the present invention.
Figure 6:
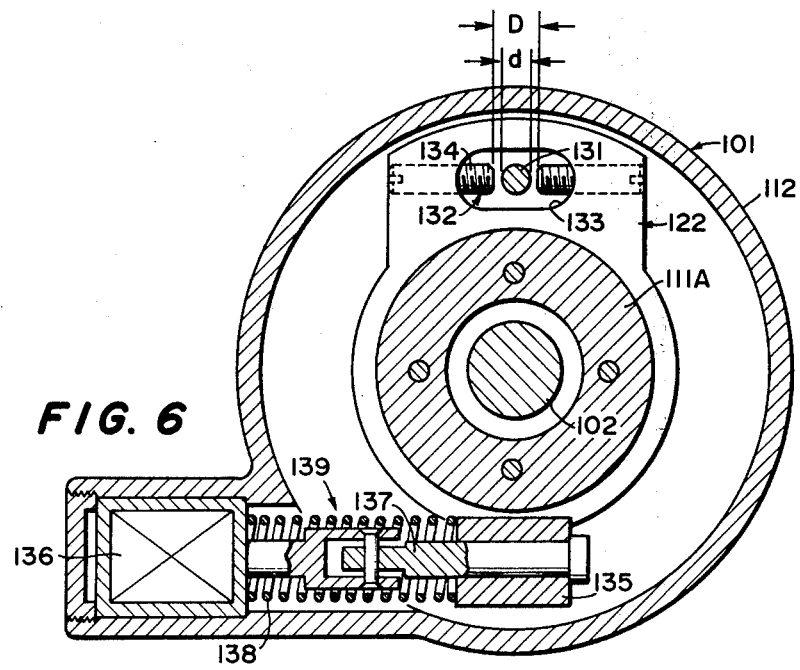
FIG. 6 is a close sectional view taken along the line VI—VI in FIG. 5.

Referring to FIGS. 5 and 6, shown are another embodiment of a rotational angle detecting device in accordance with the teachings of the present invention. This embodiment contemplates that the disk is rotated together with the shaft and the sensing means is transferred for a predetermined amount so that the backlash can be compensated for. Since certain elements of this embodiment are the same as those described in the previous embodiment, like elements are given like reference numerals andd a detailed description of their interconnection and operation will be omitted.

Disk 115 is integrally fixed to the shaft 102 supported in the case 112 through bearing 111. The disk 115 is located opposite the sensing means 122 comprising a lamp 123 and a light receiving element 124. A projection 111A is formed in one inner side of the case 112 and rotatably provided thereon with the sensing means 122 in a manner such that the sensing means is coaxial with the shaft 102 and the disk 115. Additionally, the sensing means 122 has a second engageable member 132 located opposite to a first engageable member 131 consisting of a pin provided on the case 112 and projecting therefrom. The second engageable member 132 is provided on the sensing means 122 and consists of an elongated hole 133 through which the first engageable member 131 is movable and a pair of headless screws 134. The ends of the headless screws 134 project into the elongated hole 133 and are located opposite to the first engageable member 131. The distance D between the pair of headless screws 134 is equal to a spacing jointly corresponding to the backlash of the screw shaft 6 added to the thickness d of the first engageable member 131. A slide ahaft 137 of an electromagnetic clutch 136 is connected to one portion of the sensing means 122 through a connecting member 135. The slide shaft 137 is made bendable at the intermediate portion thereof and constantly energized in the direction of projecting from the electromagnetic clutch 136 as a result of the compression coil spring 138 pined between the electromagnetic clutch 136 and the connecting member 135. By this means, the first engageable member 131 and one of the headless screws 134 (to the right in FIG. 5) of the second engageable member 132 are adapted to be constantly abutting each other. The connecting member 135, electromagnetic clutch 136, slide shaft 137 and compression coil spring 138 constitute a driving mechanism 139. The electromagnetic clutch 136 of driving mechanism 139 is adapted to move the connecting member 135 against the spring 138 by being actuated by a signal representing rotation of either the handle 9 or the feed screw shaft 6 in a predetermined direction.

In operation, just as in previous embodiment, the movement of the slider 2 is converted into rotation of the disk 115 for measurement. However, in this embodiment, the electromagnetic clutch 136 of the driving mechanism 139 is driven when the feed screw shaft 6 is rotated in the predetermined direction and the first engageable member 131 and the headless screw 134 (to the left in FIG. 6) of the second engageable member 132 is brought into abutting relationship with each other. On the other hand, if the feed screw shaft 6 is rotated in other direction, the operation of the electromagnetic clutch 136 is discontinued and the first and second engageable member 131 and 132 are returned to their initial positions. By this action, the sensing means 122 moves by an amount corresponding to the backlash thereby relatively compensating for an amount corresponding to the backlash of the disk 115 which has rotated together with feed screw 6. That is, the sensing means 122 moves in the same direction as the disk 115 has moved by an amount through which the disk 115 has rotated and hence, in reality, same effect is achieved as the disk 115 did not rotate by an amount corresponding to the backlash. Thus, the compensation for the backlash is possible for the rotation in either direction. Furthermore, the electromagnetic clutch 136 may be replaced by a cylinder or other means in this embodiment. In addition, the signal for the electromagnetic clutch 136 can be generated by a microswitch which is actuated by the rotation of the feed screw 6.

In all cases it is understood that the above described embodiments merely illustrates but a small number of the many possible specific embodiments which represent applications of the principles of the present invention. Numerous other arrangements can be readily devised by those skilled in the art without departing from the spirit and scope of the invention.

I claim:

1. A contour measuring apparatus of the type comprising a stylus for contacting the outer surface of the object to be measured, a support arm being mounted on a distal end thereof of said stylus, a slider movable in parallel with the longitudinal direction of sid support arm and oscillatingly movable and pivotally supporting said support arm about a horizontal axis perpendicularly intersecting the longitudinal direction of said support arm, a feed screw shaft threadably coupled to said slider so as to move said slider in parallel with the longitudinal direction of said support arm and a differential transformer provided between said support arm and said slider, said contour measuring device being characterized by:
    a driven gear provided at one end of said screw shaft;
    a first clutch;
    an idle gear meshing with said driven gear and coupled to said first clutch;
    a motor couple to said first clutch;
    a second clutch coaxially connected to said driven gear;
    a manual handle connected to said second clutch; and
    a rotational angle detecting device digitally detecting rotation of said screw shaft, said rotational angle detecting device comprises:
       a case;
       a shaft rotatably supported by said case and connected to said feed screw shaft;
       a rotational angle detecting disk operationally associated with said shaft;
       a sensing means for sensing rotation of said disk; and
       transferring means for transferring said disk in a direction of compensation for the backlash between said feed screw shaft and said slider when the rotation of said shaft is started.

2. A contour measuring apparatus according to claim 1 wherein said transferring means comprises:
    a first engageable member secured to said shaft;
    a second engageable member secured to said disk and rotatably support by said shaft and located adjacent to said first engageable member through a spacing corresponding to the backlash of said feed screw shaft;
    a frictional mechanism provided between said disk and fixed portion of said case for regulating of free rotation of said disk;
    whereby said engageable member and said second engageable member are moved by a distance corresponding to the amount of backlash of said feed screw shaft when the rotation of said screw shaft is started thereby transmitting the rotation of the feed screw shaft to said disk through said shaft and said first and second engageable members.

3. A contour measuring apparatus according to claim 1 wherein said transferring means comprises:
    a first engageable member provided in said case;
    sensing means rotatably provided in said case;
    a second engageable member provided on said sensing means and located adjacent to the first engageable member through a spacing corresponding to the backlash of said feed screw shaft; and
    a driving mechanism for turning said sensing means in a direction of compensation for the backlash of said feed screw shaft by a signal for starting the rotation of said feed screw shaft so as to cause the first and second engageable member to abut on each other.

4. A contour measuring apparatus according to claim 3 wherein said driving mechanism comprises an electromagnetic clutch.

5. A contour measuring apparatus of the type comprising a stylus for contacting the outer surface of the object to be measured, a support arm being mounted on a distal end thereof of said stylus, a slider movable in parallel with the longitudinal direction of said support art and oscillatingly movable and pivotally supporting said support arm about a horizontal axis perpendicularly intersecting the longitudinal direction of said support arm, a feed screw shaft threadably coupled to said slider so as to move such slider in parallel with the longitudinal direction of said support arm and a differential transformer provided between said support arm and said slider, said contour measuring device bein characterized by:
    a driven gear provided at one end of said screw shaft;
    a first clutch;
    an idle gear meshing with said driven gear and coupled to said first clutch;
    a motor couple to said first clutch;
    a second clutch coaxially connected to said driven gear;
    a manual handle connected to said second clutch; and
    a rotational angle detecting device digitally detecting rotation of said screw shaft, said rotational angle detecting device comprises:
       a case;
       a shaft rotatably supported by said case and connected to said feed screw shaft;
       a rotational angle detecting disk operationally associated with said shaft;
       a sensing means for sensing the rotation of said disk; and
       transferring means for transferring said sensing means in a direction for compensating for the backlash between said feed screw shaft and said slider when the rotation of said shaft is started.

6. A contour measuring apparatus according to claim 5 wherein said transferring means comprises:
    a first engageable member secured to said shaft;
    a second engageable member secured to a said disk and rotatably supported by said shaft and located adjacent to said first engageable member through a spacing corresponding to the backlash of said feed screw shaft; and
    a frictional mechanism provided between said disk and a fixed portion of said case for regulating the free rotation of said disk.

7. A contour measuring apparatus according to claim 5 wherein said transferring means comprises:
    a first engageable member provided on said case;

sensing means rotatably provided on said case;
a second engageable member provided on said sensing means and located adjacent to said first engageable member through a spacing corresponding to the backlash of said feed screw shaft; and
a driving mechanism for turning said sensing means in a direction of compensation for the backlash of said feed screw shaft by a signal for starting the rotation of said feed screw shaft so as to cause said first and second engageable members to abutt on each other.

8. A contour measuring apparatus according to claim 7 wherein said driving mechanism comprises an electromagnetic clutch.

* * * * *